United States Patent [19]

Kelly

[11] 4,233,961
[45] Nov. 18, 1980

[54] SUSPENDED, HOT-BOX SOLAR COLLECTORS

[76] Inventor: Donald A. Kelly, 58-06 69th Pl., Maspeth, N.Y. 11378

[21] Appl. No.: 37,767

[22] Filed: May 10, 1979

[51] Int. Cl.³ .............................................. F24J 3/02
[52] U.S. Cl. .................................. 126/436; 126/430; 126/438; 126/449; 126/450
[58] Field of Search ............... 126/400, 450, 417, 438, 126/436, 439, 430, 437, 449, 429

[56] References Cited

U.S. PATENT DOCUMENTS

| | | | |
|---|---|---|---|
| 3,841,302 | 10/1974 | Falbel | 126/439 |
| 3,991,936 | 11/1976 | Switzgable | 126/430 |
| 4,016,861 | 4/1977 | Taylor | 126/400 |
| 4,059,226 | 11/1977 | Atkinson | 126/430 |
| 4,088,116 | 5/1978 | Pastor | 126/439 |
| 4,088,266 | 5/1978 | Keyes | 126/400 |
| 4,099,558 | 7/1978 | Bricard et al. | 126/400 |
| 4,121,563 | 10/1978 | Gold | 126/400 |
| 4,132,219 | 1/1979 | Cohen et al. | 126/438 |
| 4,136,674 | 1/1979 | Korr | 126/439 |
| 4,138,061 | 2/1979 | Besack | 126/400 |

Primary Examiner—James C. Yeung
Assistant Examiner—Daniel O'Connor

[57] ABSTRACT

The suspended, hot box solar collector is designed to provide approximately double area solar insolation on to a closed, truncated triangular structure which is double-glazed and insulated to collect and store solar heat energy for hot air space heating.

Direct solar radiation is collected through sloped front, bottom and top double-glazed windows, with reflected solar rays received through the same windows by means of fixed, highly reflective surfaces of about the same corresponding total surface area.

Solar radiation collection in three planes, both direct and reflected will produce very high temperatures with the storage of a portion of this heat energy within thermal storage compartments within the unit.

The suspended, hot box unit is designed for both winter time space heating and summer-time photovoltaic/electric power generation, for both back yard and flat roof top installations.

10 Claims, 4 Drawing Figures

SUSPENDED, HOT-BOX SOLAR COLLECTORS

BACKGROUND OF THE INVENTION

Solar heated air is an attractive means of home space heating since the hardware components can be made at moderate costs and and there are no system winter time freezeups and major heat transfer problems involved with hot air arrangements.

There are a number of solar heated air systems on the market which are generally similar to solar hot water flat plate collectors in regard to size and shape, but with larger internal volumes so that relatively large volumes of air may be heated and transferred into the home or building. The various types range from passive, thermosyphoning window units for southern window exposures to all-transparent plastic air bags with top lens like ribs.

The more conventional active type units consist of sealed, flat plate construction with continuous air passages within the area, with a blackened absorber structure utilized to absorb solar heat.

While the passive type of solar hot air heater is relatively inexpensive to construct they can usually heat only a single room or local volume within a home or building due to the lack of forced air movement from the unit. The active types of solar hot air units or systems are generally superior to the passive types in terms of the capacity to heat large house volumes and produce nearly uniform temperatures throughout a building, and are particularly cost/effective when connected to existing hot air duct installations in the home or building.

A shortcoming for some solar hot air systems is their lack of effective heat storage means over an extended number of non-sunlit days, with solar heated hot water storage arrangements being superior in this respect compared to hot air storage means. The so-called solar storage batteries are an excellent means for storing solar heated air since the uniform rows of elongated vertical cylinders provide a relatively large surface area within a restricted space for both storing and releasing solar heated air.

In a properly designed solar hot air heating system with a built in rock storage bin in the basement or sub-basement, adequate heat storage over several non-sunlit days can be provided. The better systems provide additional duct runs so that the home can be heated directly from the solar collector, or the heat from the collector can be stored for future use. Such a versatile arrangement is ideal but usually requires a large rock storage bin volume to be effective over three to four non-sunlit days.

These ideal solar hot air heating systems are not economically feasible for the majority of existing homes where difficult excavating for a large volume rock bin would prove to be too costly, so that some other approach must be taken towards acceptable solar heating retrofit arrangements. A solar hot water heating system may be acceptable for many homes since the water heat exchangers are smaller and can be installed adjacent to existing oil or gas burners.

Where homes have sizable grounds or back yards, the installation of an A-frame type of hot air heating and storage unit may provide a cost/effective means of including solar space heating for many homes. The A-frame type of unit is a significant development in solar hot air heating because of its basic simplicity an and effective operation, and is ideal for backyard installations where the solar conversion means cannot be retrofitted to the existing home or building.

A key advantage to the exterior yard/detached A frame unit is that it utilizes both direct and reflected solar rays to heat the air within the fully insulated A-frame housing interior. The front reflective panel is hinged at the front base so that it can be folded up during the summer months, when heated air is not normally required, but provides full area solar reflection into the A frame housing during the winter months when effective solar heating is most needed. The combination of both equal direct and reflected solar ray transmission into one solar collection volume is a distinctly attractive/cost-effective approach to solar hot air heating systems because of the moderate cost of all the component elements involved.

An important component within the A-frame unit is the front blackened absorber plate which directly receives the solar rays through the double-glazed front windows. This aluminum absorber plate must be made in multi-layers or labyrinth/corregated form to provide the greatest possible surface area within a limited window area.

The A-frame unit is an attractive solar collection method for detached backyard installation where space is available and the unit can be placed facing a true south axis, at an optimium, or mean slope for the latitude of the installation site. Solar hot air heating arrangements offer several advantages over corresponding hot water systems including generally lower installation costs and the elimination of anti-freezeup provisions. For homes or buildings with existing hot air ducts, such solar hot air heating arrangements should be given first choice consideration when the question of adding solar energy conversion for a home arises.

Although the hot air ducts, to and from the home must be dug in slightly below the ground surface and insulation added, this necessity does not usually present major installation problems. All of the hot air ducts should have relatively large radius turns as required, so that the hot air flow is not snubbed or impeded as it moves along ducts which would impose unnecessary loading on the air blowers.

The present rock storage bins used in solar planned houses are not entirely satisfactory, since large storage volumes are required which usually precludes their retrofitting into most existing homes. The eutectic salts—(Gluber's salts) heat storage means is an ideal medium, but somewhat costly for reduced storage volumes for retrofitting solar hot air heating systems, so that alternative material and methods may be sought for the backyard installations. Eutectic salts are a more active means of storing and releasing solar heat than rock storage bins and can occupy considerably less space than a corresponding rock bin. The eutectic salts undergo a change of state from a solid to a liquid when solar heat is absorbed. They remain at a uniform, stable temperature as the solar heat is gradually released and return to their normal solid state condition.

The basic A-frame unit and the principle of full area solar reflection can be expanded to include solar ray reflection into the top and bottom of a suspended type of double-glazed and insulateed solar collector. This suspended, or elevated type of solar hot air collector will produce very high temperatures within the housing which can be stored to produce useful home heating over above four to five days to overcast, winter days. An A-frame type of unit in this suspended form can be an advantageous addition to flat roof top homes or buildings, since it can be aligned on a true south axis at the correct solar slope for the latitude of the installation site.

The suspended, hot box type of solar hot air collector can also serve as a heat storage unit for additional hot air linear solar trough concentrators which are directly connected, in-line with each hot box storage unit. When connected in this way there is no longer any need for some of the extra front reflective surfaces for the suspended type of hot box unit and it may be modified accordingly. The suspended heat storage unit will contain a maximum volume of eutectic salt trays which are all connected to the front absorber plate. The solar heated air from the linear solar concentrators will be blown into the hot box storage unit(s) by multiple fans within the ducts of the linear concentrator sections.

SUMMARY OF THE INVENTION

The suspended, hot box solar collector is based on the present A-frame closed chamber type of solar hot box, hot air collectors, with the addition of top and bottom double-glazed window sections.

Both the top and front window sections receive direct solar rays, plus reflected solar rays by means of fixed, highly reflective surfaces extending out at the front, and top southerly direction of the suspended hot box unit. The bottom window section receives only reflected solar rays from the same extended front reflective surface.

Since all of the direct area solar windows are approximately equalled by the total area of the reflective surfaces of the unit, the solar insolation is approximately doubled as far as the solar collection chamber is concerned.

This present suspended, hot box solar collector provides three planes of solar radiation collection within a limited volume, truncated, triangular chamber so that very high temperatures can be obtained within the chamber for transmission and storage. The combining of both equal direct and reflected solar ray collection into one solar collection volume provides an economical solar hot air heating flow for many homes and buildings, plus extended periods of heat storage when required. This type of solar collector is best adapted to backyard installations closely adjacent to the home and must have full southern exposure for optimum operation, but may also be installed on nearly any type of flat rooftop building.

The collection chamber consists of a closed, truncated, triangular structure which has front, top, and bottom double-glazed plastic windows for high temperature solar heated air collection and storage. The basic closed chamber is raised from the ground or base level by the four main side post extensions so that solar rays may be reflected upward through double-glazed windows on the underside of the closed chamber unit. The reflectivive surfaces extended outward in front of the collector also extend directly under the closed chamber so that so rays may be reflected upward, while solar radiation is mainly reflected onto the front double-glazed windows.

The hot box chamber is raised approximately one-third of its full height so that an adequate solar ray entrance area is provided for reflection in to the bottom windows.

The top, truncated surface of the closed chamber is fitted with a double-glazed window so that solar rays enter the chamber at oblique angles and are reflected into the chamber from an angled, top reflective surface. This top reflective surface panel may be hinged at the top, rear edge of the closed chamber and held at an appropriate angle by two heavy side rods which are locked at the sides of the chamber with locking thumb screws.

The closed chamber is fitted with black, correguated aluminum absorber plates behind each of the double-glazed windows at the front, top and bottom planes so that the incoming solar heat is retained within the unit. The absorber plates may also be made of flat aluminum sheet which contain multiple, equally spaced black aluminum tubes which are rivetted vertically in place on eacch of the flat absorber sheets.

The receiving surfaces of the absorber plates must be located no more than five inches away from the inside surface of the inner glazed window so that effective hot air collection zones are established around three planes of the closed chamber. An economical form of absorber plate will consist of thin, correguated aluminum sheet with the vertical corrugations providing air passage and an extended surface in compact form.

Multiple metal trays containing eutectic salts, or other heat storage chemicals are uniformly located within the chamber and are all horizontally secured at one end to the back surface of the the front absorber plate, and to a removable aluminum framework at the back of the closed chamber. The back of the unit has removable, insulated sections for the periodic servicing and inspection of the closed chamber. The two sections are fastened in place and sealed to maintain fully insulated integrity for the closed chamber.

An air inlet vent is located at one rear, bottom corner of the closed chamber so that solar preheated air enters the chamber, with solar cell powered fans utilized to circulate the heated air over the multiple heat storage trays. The solar preheated air is warmed by a duct extension, with loops to provide a fairly long length prior to the air entrance into the closed chamber.

A large air outlet hole is located on the side, upper face of the closed chamber opposite from the air inlet vent so that heated air is drawn out of the unit and into the transfer duct lengths for the home or building. All the duct bent radii must be as large as practical to reduce air flow resistance as much as possible. The transfer duct length from the unit to the home must be well insulated with fiberglass wrapping or some other form of insulation to minimize heat losses to the surrounding air or ground.

One 110 V.A.C. air moving fan is located at the upper side of the closed chamber adjacent to the outlet hole to provide positive hottair displacement from the unit at all times, and may be manually or thermostatically controlled from the home or building. A bi-plane or tri-plane reflective surface panel must be located at the rear of the lower open area below the closed chamber so that solar rays are reflected uniformly upward into the double-glazed window of the chamber from the base level reflective surface. The base level reflective surface directly under the chamber, alone is not capable of reflecting solar rays up into the closed chamber, and therefore a bi or tri-plane second reflective surface is required to complete the upward solar radiation. It is desirable that the lower solar ray reflection be uniformly distributed across the lower window width of the chamber, so that a tri-plane reflective panel may be necessary to provide this distribution.

The framing for the closed chamber and the end post extensions may be made from conventional 2×4 studs which are treated with wood preservative, and redwood stain/sealer. All wood surfaces used in this construction must be treated in this manner, with all the side and back surfaces sheathed with a double-layer of ½" or ¾" plywood, with full insulation between the sheathing. Rock wool or some other suitable insulation must be provided between the plywood sections to minimize heat losses from these areas of closed chamber. In addition aluminum foil will be applied to the extreme inside and outside surfaces of the plywood sheathing. The exterior surfaces of the plywood will be properly sealed with appropriate aluminum siding as the final outside surface of the unit.

Approximately seven longitudinal 2×4's main members will be used to join the two shaped end frames with large metal "L" brackets to aid in keeping the completed chamber square during the sheathing process. Recessed stops will be provided at the front, bottom and top frames, so that the double-glazed windows may be placed and retained within of the frames. Silicone or butyl rubber caulking will be used to seal in each of the double-glazed windows to the frames which form the closed hot box chamber. All exposed wood 2×4 and other wood surfaces must be covered with thin aluminum sheet/siding as an external protective surface to increase the service life of the completed unit.

The fully assembled suspended, hot box solar collector must be placed in a true south facing attitude with a mean or average solar slope matching the latitude of the installation.

The hot box collector will be effective for collecting solar radiation at extreme low winter sun angles and for the moderate spring and fall seasons in the northern latitudes.

Because of the usually high summer time solar temperatures in most latitudes it may not be possible to safely utilize the double solar insolation intensity on the double-glazed fiberglas windows in some installations. In this case the front and bottom windows may be covered with panels containing silicone photovoltaic arrays which may be utilized to advantage in producing higher-than-normal total wattages due to the combined direct and reflected solar insolation. The solar photovoltaic cells used must be of a type that can withstand the prolonged effects of double solar exposure—(2×/-2 suns) without measurable long-term deterioration.

Another possible option for utilizing the normally excessive summer time solar heat within the hot box is that of preheating water prior to its transfer into a hot water-to-steam solar concentrator arrangement which is placed in-line or adjacent to the suspended, hot box unit(s). It is possible that both summer time modes of operation may be utilized with the top double-glazed window section providing the water preheating function while the converted photovoltaic cell panels cover the front window sections. Removable water heating coils may be mounted near the top of the closed chamber for the water pre-heating function, with tubing connections provided at the outside faces of the unit.

A second, optional 110 V.A.C. air moving fan/motor may be required within the closed chamber to circulate the collecting hot air towards the duct outlet and the primary air moving fan with the duct outlet section. Both fans will be energized together and preferably controlled by a thermostatic switch set to close within an adjustable range of from 65 degrees F., to about 90 degrees F.

The small, multiple solar photovoltaic cell powered fans previously described, are an ideal substitute for the second 110 V.A.C. motor/fan since these will be automatic in operation, with amperage supplied to the fan/motor which is proportional to the solar insolation on the unit at any given time.

An optional covered outlet port is located in the side panel, opposite from the primary outlet air duct, to allow for the connection of an air inlet duct from a linear array of solar parabolic concentrators. When connected in this way, the hot box unit will serve as the storage means for the high concentrator temperatures passed through from these linear units.

The suspended, hot box solar collector is projected as a practical, low-cost solar conversion unit for backyard or flat rooftop installations, and is ideal for use as a hot air storage unit used in conjunction with an array of linear parabolic concentrators where space is available.

It is a principal objective of the present invention to provide a low-cost, cost-effective hot air solar collector for a wide variety of homes and buildings in the northern latitudes of the United States.

It is a further objective of the invention to provide effective direct and reflected solar utilization on the front, top, and bottom double-glazed window surfaces of a hot-box unit for high temperature, hot air collection and storage.

Other objectives, features and advantages of this present invention will be understood from the following description, when taken in conjunction with the accompanying drawings with their reference numerals. It should be understood that variations may be made in the details and general features of the design concept without departing from the spirit and scope of the invention.

Several Disclosure Documents have been filed with the Office which describe the present invention and its various components and adaptation.

No. 077,813—Solar Hot Air Collector & Heat Storage Unit.

No. 071,505—Solar Concentrating Hot Air Heating System.

No. 077,339—Solar Conversion Siding.

REFERRING TO THE DRAWINGS

DESCRIPTION OF THE PREFERRED EMBODIMENT

Figure 1:
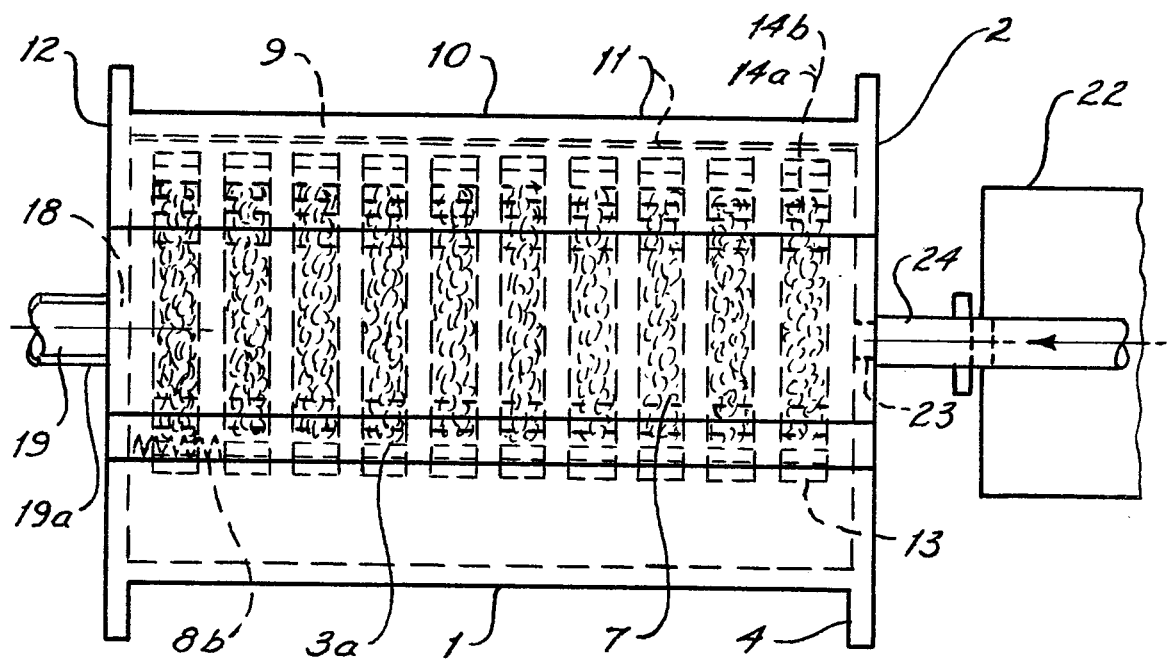
FIG. 1 is a plan view of the suspended, hot-box solar collector.
Figure 2:
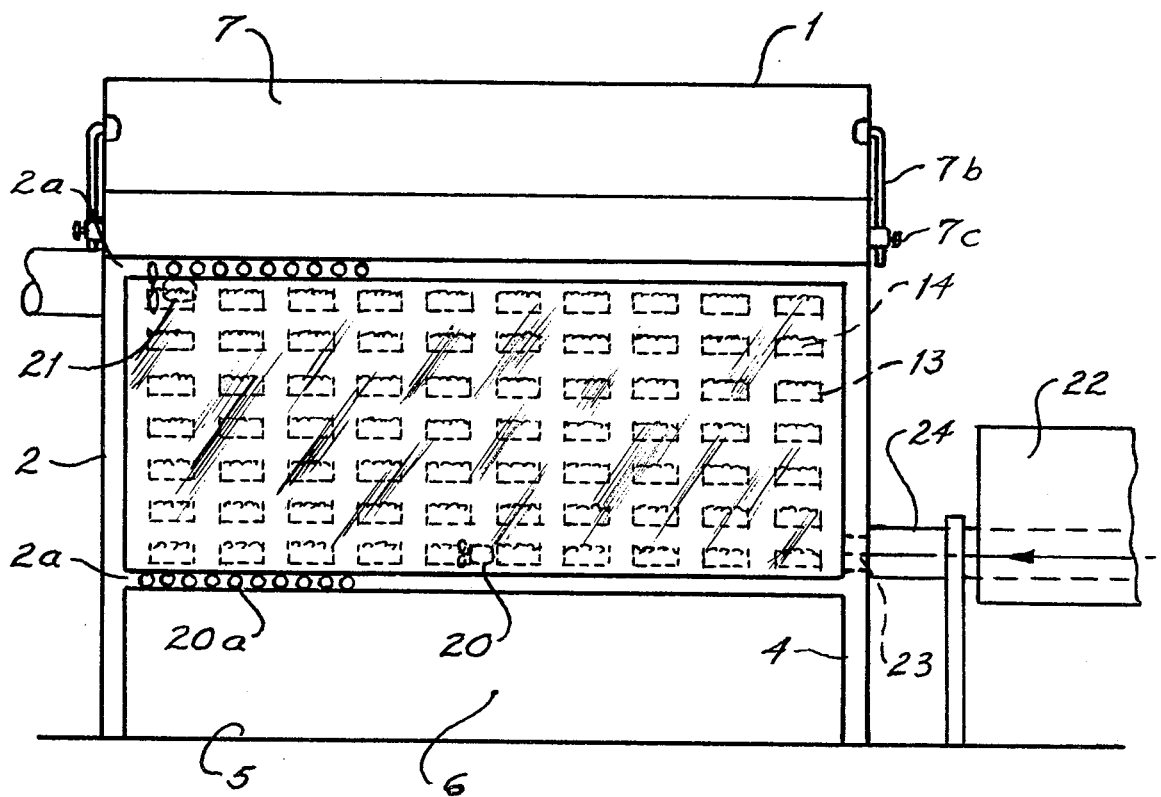
FIG. 2 is a front elevation view of the suspended, hot-box solar collector.
Figure 3:
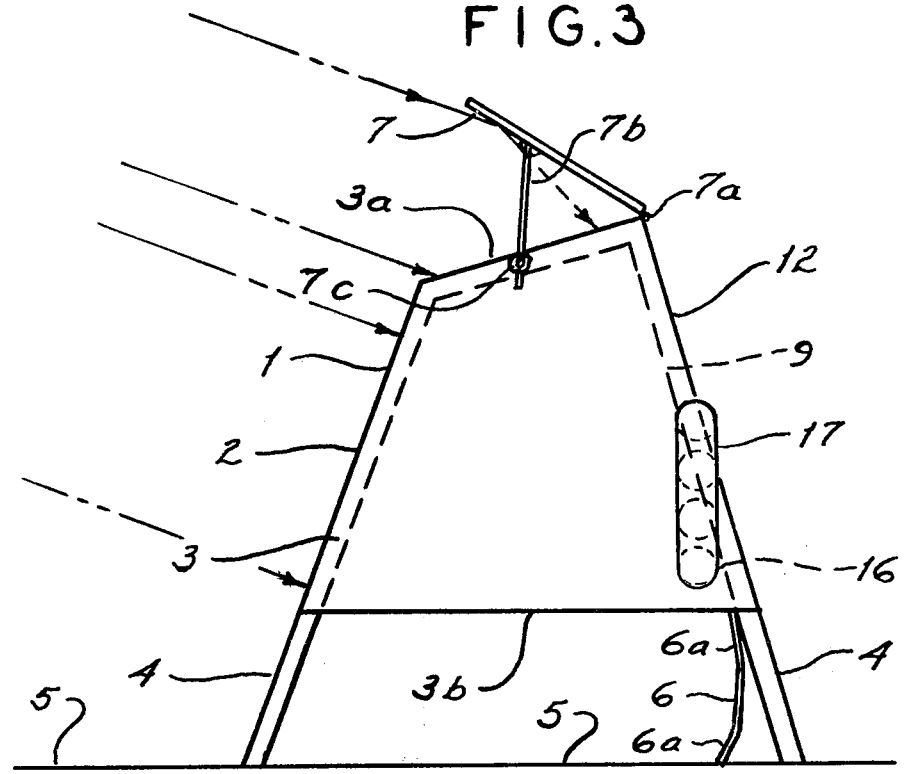
FIG. 3 is a side elevation of the suspended, hot-box solar collector.
Figure 4:
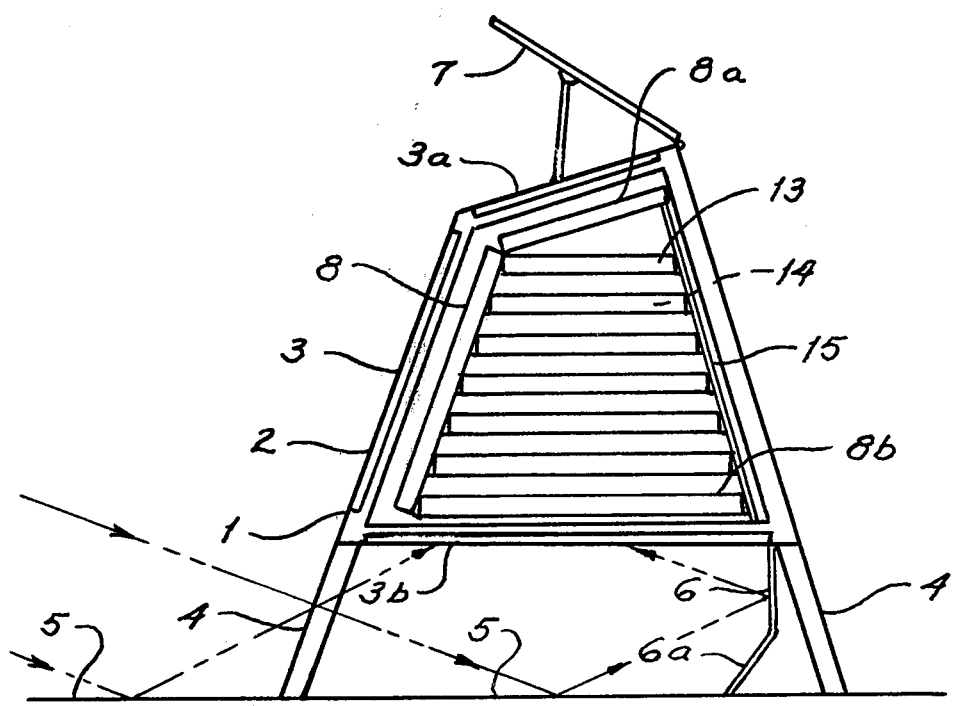
FIG. 4 is a cross-section through the suspended, hot-box solar collector.

Referring to the drawings, numeral 1, illustrates the suspended, hot-box solar collector unit, which is comprised of an insulated hot-box chamber 2, containing front, top and bottom double-glazed window sections 3, 3a and 3b, respectively.

The hot-box chamber 2, is raised approximately one-third of its height by four corner posts 4, which are securely fastened to the ground or flat roof top surface. The front, double-glazed window section 3, must exactly face south, at a mean winter/summer solar slope angle for the latitude of the unit installation.

The hot-box chamber 2, must be level in the front and side directions, with adequate clearance from all surrounding buildings, trees and other obstacles, so that no, or a minimum of daily solar overshadowing occurs on the unit.

A front reflective panel 5, comprised of aluminum/mylar film or conventional plastic mirrors extend out from under the hot-box chamber 2, in a southerly direction from the unit 1, a distance equal in length to the height of the hot box solar collector unit 1. A lower, rear reflective panel 6, which is made up of two or three longitudinal planes 6a, is located at an angle between the front reflective panel 5, and the rear area of the bottom double-glazed window section 3b.

A top reflective panel 7, is located at an angle at the rear, top edge of the top, double-glazed window section 3a, and secured by a piano hinge 7a, with support rods 7b, and lock screws 7c, holding the reflective panel 7, at the required seasonal reflective angle.

A blackened, corrugated aluminum absorber plate 8, is located closely behind the front double-glazed window 3, along with similar absorber plates 8a, and 8b, located closely inside of the top and bottom double-glazed window section 3a and 3b, respectively.

The hot-box chamber 2, and the four corner posts 4, are made of standard available materials and conventional insulation 9, is fully applied between the sheathing layers 10, of the unit sides and rear faces. Foil insulation 11, is applied on the inside and outside of the sheathing layers 10, with aluminum siding 12 secured to the outside of the hot-box chamber 2.

Multiple, identical elongate trays 13, containing eutectic salts 14, or other type of heat storage material, are uniformly and horizontally arrayed within the interior of the hot-box chamber 2. The elongate trays 13, and salts 14, are attached to the rear surface of the front absorber plate 8, and to a generally vertical aluminum grid frame 15.

An inlet air port 16, is located at the lower side or rear area of the hot-box chamber 2, which contains a medium mesh screen 16a. A duct extension 17, is connected to the inlet air port 16, which is formed in several loops of blackened aluminum sheet, to provide a pre-heating function for the intake air into the unit 1.

An outlet air port 18, is located at the upper side or rear area of the hot-box chamber 2, opposite from the inlet air port 16. Hot air transmission ducting 19, is connected to the outlet air port 18, to transmit the hot air to the home or building, with insulation 19a, covering the ducting 19, to minimize heat losses.

Multiple, small D.C. fan/motors 20 are uniformly located within the hot-box chamber 2, to slowly move the collecting hot air over the elongate trays 13, and salts 14, and subsequently toward the outlet air port 18. The multiple, small D.C. fan/motors are powered by an array of silicon photovoltaic cells 20a, located along the front edges and front divider strips 2a, of the hot-box chamber 2. By utilizing silicon photovoltaic cells in this way the hot air movement within the hot box chamber 2, is automatic and proportional to the degree of solar insolation on the hot box solar collector unit 1.

A 110 V.A.C. 21 fan/motor is located in-line with the outlet air port 18, on the inside of the hot box chamber 2, to provide positive displacement of the heated air into the hot air transmission ducting 19.

Several alternative components for the hot box solar collector unit 1, must also be described, since they become practical for use when the first described components are not available, or not as effective for some installations.

An alternate for the blackened, corrugated aluminum absorber plate 8, will be the "V" form of absorber plate 8 which consists of multiple, identical strips of blackened aluminum sheet of about 4 inches to 5 inches in width which are riveted or crimped together along their lengths. This type of absorber configuration will provide a very large total surface area for heat absorption within a limited window surface area.

An alternate for the eutectic salts heat absorbing material 14, will be thin aluminum foil which is coated with a uniform layer of a eutectic salt solution with aluminum paint used as the vehicle for the solution. After the salt/paint solution is dry, the aluminum foil will be uniformly crumpled into compact volumes for placement into the existing elongate trays 13.

This method of heat storage is a way to disperse the density of the eutectic salts alone, and introduce a second heat storage medium, namely the metal foil with its myriad of internal passages and cavities, lined with the eutectic salt layers. The aluminum foil volumes will be indicated as 14a, and the eutectic salt layers as 14b.

For special applications where the suspended, hot-box solar collector unit 1, is used for additional heat storage from linear parabolic concentrators 22, an entrance hot air port 23, will be required within the hot-box chamber 2. A flexible, insulated transfer duct 24, will connect one end of the concentrators 22, air duct with the entrance hot air port 23.

What is claimed is:

1. A suspended hot box solar collector comprised of a closed insulated chamber containing front, top and bottom double-glazed transparent windows,
    said closed insulated chamber consists of an angular truncated triangular cross section shape which is constructed in any convenient modular length,
    said closed insulated chamber is elevated approximately one-third of its total height by four corner posts which are integral with the said closed insulated chamber,
    a fixed horizontal reflective surface disposed directly under said closed insulated chamber at base level in a southerly direction in front of said suspended hot box solar collector to a distance nearly equal to one-third the total height of said closed insulated chamber,
    a three plane reflective element disposed at the rear bottom of said closed insulated chamber with the lower front edge secured to said fixed horizontal reflective surface,
    the opposite top edge of said three plane reflective element angled upward toward the rear lower face of said bottom double glazed transparent window,
    an adjustable top reflective surface disposed at an adjustable angle at the rear top northern edge of said top double-glazed transparent window,
    a continuous piano type hinge secured at the rear top northern edge of said top double-glazed transparent window and the underside of said adjustable top reflective surface,
    twin support rods secured at the sides of said adjustable top reflective surface and fastened to the upper sides of said closed insulated chamber by means of twin locking screws, adjustment means for said twin support rods within said twin locking screws, a black corrugated metal absorber plate disposed behind the rear face of said front double-glazed transparent window, a horizontal black corrugated metal absorber plate disposed under said top double-glazed transparent window, a horizontal black corrugated metal absorber plate disposed above the inner face of said bottom double-glazed transparent window, multiple identical perforated metal trays uniformly and horizontally disposed within the interior of said closed insulated chamber, attachment of the front ends of said multiple identical perforated metal trays to the rear nearly vertical surface of said black corrugated metal absorber plate, attachment of the rear ends of said multiple identical perforated metal trays to a rear metal grid framework within said closed insulated chamber, eutectic salts uniformly dispersed within each of said multiple identical perforated metal trays, an inlet air port disposed at the lower rear corner of said closed insulated chamber, an outlet hot air port disposed at the upper side of said closed insulated chamber opposite from said inlet air port, a motor driven fan disposed in line with said outlet hot air port on the inside of said closed insulated chamber, multiple small D.C. motor driven fans uniformly disposed within said closed insulated chamber, multiple silicon photovoltaic solar cells mounted along the outside front strip surfaces of said closed insulated chamber, to power said multiple small D.C. motor driven fans.

2. A suspended hot box solar collector according to claim 1, in which said inlet air port is externally connected to a black metal duct extension formed in one or more continuous loops, said inlet air port contains a medium mesh screen over the full port area, said outlet hot air port is externally connected to a continuous duct which is routed underground to the home or building, full insulation means over said continuous duct above ground from said closed insulated chamber and below ground to the said home or building.

3. A suspended hot box solar collector according to claim 1, in which said closed insulated chamber is constructed of double layers of plywood sheathing with fiberglass insulation placed between the layers of plywood sheathing, aluminum foil secured to the inside faces of said double layers of plywood sheathing, vapor barrier material fastened to the outside layer of plywood sheathing, aluminum siding fastened to the outside of said vapor barrier material as the final surface of said closed insulated chamber.

4. A suspended hot box solar collector according to claim 1, wherein said three plane reflective element is adjusted and fixed to provide maximum reflected solar ray distribution into said bottom double glazed transparent window during the winter season, said adjustable top reflective surface is seasonally adjusted and fixed to provide maximum reflected solar ray distribution into said top double glazed transparent window, said front bouble glazed transparent window is disposed at the correct average seasonal sun slope angle corresponding to the latitude of each specific installation site.

5. A suspended hot box solar collector according to claim 1, in which said closed insulated chamber is elevated not exceeding one-half of the height of said closed insulated chamber, said closed insulated chamber elevation shall not be less than one-quarter the height of said closed insulated chamber, said four corner posts are extensions of the end framing members of said closed insulated chamber, the angle of said angular truncated triangular cross section shape may be varied to correspond to optimum solar ray fall during the winter season for the latitude of the installation site.

6. A suspended hot box solar collector comprised of a closed insulated chamber containing a major front double glazed transparent window, said closed insulated chamber contains a minor top double-glazed transparent window, said closed insulated chamber contains a major bottom double-glazed transparent window, said closed insulated chamber consists of a truncated triangular cross section shape which is constructed in any convenient modular length, said closed insulated chamber is elevated approximately one-half of its total height by four corner posts which form the end framing members of said closed insulated chamber, a fixed generally horizontal reflective element disposed directly under said closed insulated chamber at base level in a true southerly direction in front of said suspended hot box solar collector to a distance not exceeding one-half the total height of said closed insulated chamber, a three plane reflective element disposed at a forward sloping angle to said fixed generally horizontal reflective element with the lower front edge in contact with said fixed generally horizontal reflective element, the opposite upper rear edge of said three plane reflective element in contact with the rear edge of said major bottom double-glazed transparent window, an adjustable upper reflective element with its reflective surface disposed downward into said minor top double glazed transparent window, said adjustable upper reflective element is hinged at the rear top northern edge of said closed insulated chamber, twin support rods and twin adjustable locking screws disposed at the sides of said closed insulated chamber with the said twin support rods pivoting within the sides of said adjustable upper reflective element, a black metal absorber plate in Vee form disposed behind the rear face of said major front double glazed transparent window, said blacke metal absorber plate in Vee form made up of multiple identical vertically elongated strips uniformly fastened together along their lengths, a black metal absorber plate in Vee form horizontally disposed under said minor top double glazed transparent window, a black metal absorber plate in Vee form horizontally disposed above the inner face of said major bottom double glazed transparent window, multiple identical perforated metal trays uniformly and horizontally disposed within the full interior of said closed insulated chamber, attachment of the front ends of said multiple identical perforated metal trays to the rear nearly vertical surface of said black metal absorber plate in Vee form, attachment of the rear ends of said multiple identical perforated metal trays to a rear vertical metal grid framework within said closed insulated chamber, uniformly crumpled aluminum foil evenly placed within all of said multiple identical perforated metal trays, bonding of a thin layer of eutectic salts to said uniformly crumpled aluminum foil with a suitable paint vehicle, moderate dense forming of said uniformly crumpled aluminum foil to produce a myriad of passages and cavities lined with eutectic salt solution within said uniformly crumpled aluminum foil, an inlet air port disposed at the lower side corner of said closed insulated chamber, a flexible insulated transfer air duct disposed over said inlet air port connected to the focal hot air linear duct of a series of linear parabolic concentrators adjacent to said suspended hot box solar collector, an outlet hot air port disposed at the upper side of said closed insulated chamber opposite from said inlet air port, a motor driven fan disposed in line with said outlet hot air port on the inside of said closed insulated chamber, multiple small D.C. motor driven fans uniformly disposed within said closed insulated chamber, multiple silicon photovoltaic cells mounted along the outside front strip surfaces of said closed insulated chamber, to power said multiple small D.C motor driven fans.

7. A suspended hot box solar collector according to claim 6, in which said suspended hot box solar collector is constructed of an open framework of said angular truncated triangular cross-section shape and modular length, fastening of plywood surfaces on the inside and outside of said open framework, suitable full insulation placed between said plywood surfaces with no void spaces left within the structure, aluminum foil insulation secured to the inside faces of said double plywood surfaces, vapor barrier material uniformly secured to the outside face of said plywood surfaces, suitable siding fastened to the outside of said vapor barrier material as the final outer surface of said closed insulated chamber.

8. A suspended hot box solar collector according to claim 6, wherein said outlet hot air port disposed at the upper side of said closed insulated chamber is externally connected to a continuous large duct which is routed underground to the home or building, full insulation means over said continuous large duct above ground from said closed insulated chamber and below ground to to the said home or building, said flexible insulated transfer air duct disposed over said inlet air port is kept as short as practical for connection to said focal hot air linear duct of a series of linear parabolic concentrators, said inlet air port contains a fine mesh screen over the full port area, suitable support and securing means for said flexible insulated transfer air duct.

9. A suspended hot box solar collector according to claim 6, in which said black metal absorber plate in Vee form has a plain non-blackened rear non-solar facing surface, a coating of a thin layer of eutectic salt solution on the plain non-blackened rear non-solar facing surface, a coating of a layer of eutectic salt solution on all interior surfaces of said closed insulated chamber, said black metal absorber plate in Vee form fabricated in one continuous plate with uniform Vee bends vertically disposed on said black metal absorber plate in Vee form, the proportions of said Vee form black metal absorber plate are not less than three units in depth to one unit of width to provide a uniformly sharp Vee configuration for the said black metal absorber plate.

10. A suspended hot box solar collector according to claim 6, wherein said closed insulated chamber is elevated not to exceed one-half the height of said closed insulated chamber, said closed insulated chamber elevation shall not be less than one-quarter the height of said closed insulated chamber, said four corner posts are extensions which are secured to said closed insulated chamber as separate components of said suspended hot box solar collector, the angle of said truncated portion of the triangular cross-section shape may be selected for optimum solar ray distribution into said minor top double glazed transparent window, mounting of said suspended hot box solar collector on a level ground or rooftop surface.

* * * * *